(No Model.)
G. AMOS.
HORSE DETACHER.
No. 412,222. Patented Oct. 1, 1889.
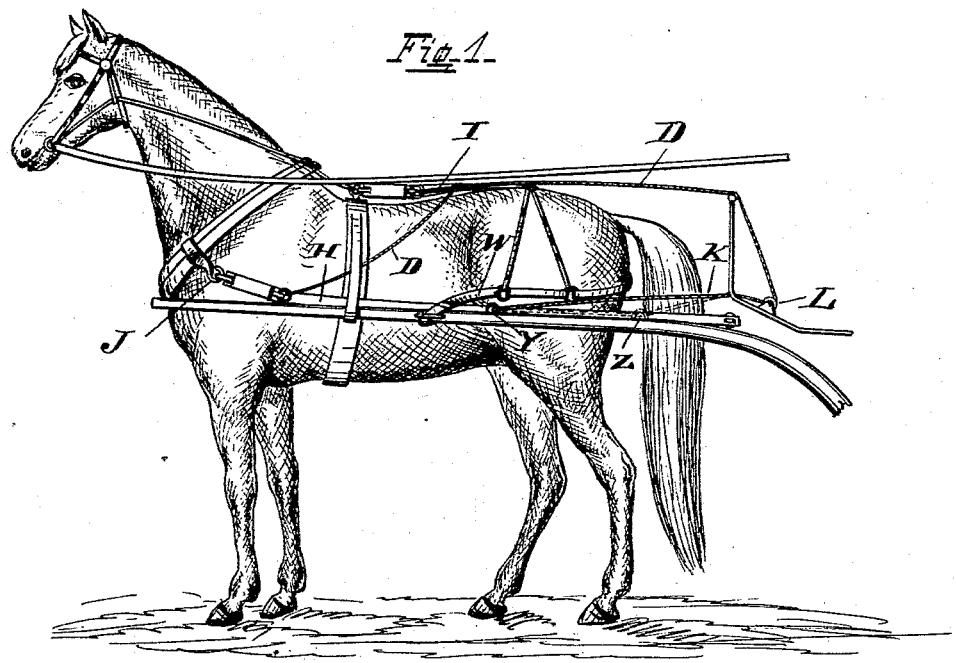
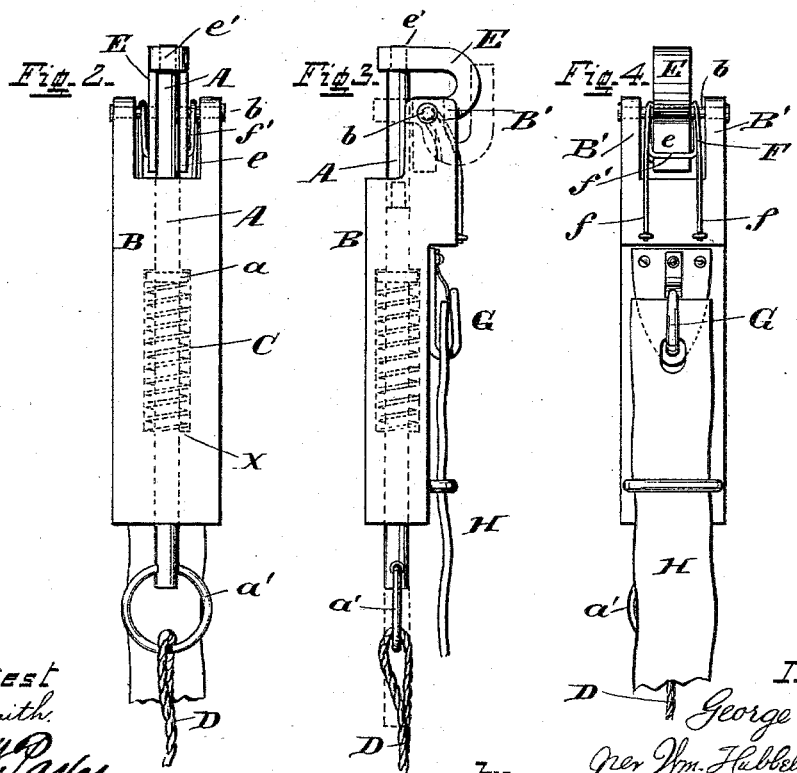
Attest
K. Smith.
G. M. Paver
Inventor
George Amos,
per Wm. Hubbell Fisher Atty.
by

UNITED STATES PATENT OFFICE.

GEORGE AMOS, OF MILLDALE, KENTUCKY.

HORSE-DETACHER.

SPECIFICATION forming part of Letters Patent No. 412,222, dated October 1, 1889.

Application filed November 6, 1888. Serial No. 290,125. (No model.)

*To all whom it may concern:*

Be it known that I, GEORGE AMOS, a citizen of the United States, and a resident of the town of Milldale, in the county of Kenton and State of Kentucky, have invented certain new and useful Improvements in Devices for Detaching Horses from Vehicles, of which the following is a specification.

The several features of my invention and the advantages arising from their use, conjointly or otherwise, will be apparent from the following description.

In the accompanying drawings, forming part of this specification, Figure 1 represents a set of harness on a horse, provided with my device. Fig. 2 is a view of the detaching device, showing what may be termed the "outside." Fig. 3 is an edge view of the same. Fig. 4 shows the opposite side of the device from that shown in Fig. 2.

The point A in the detaching device passes through the block B. It is surrounded within the block B by the spring C, which bears against the collar $a$ on the pin A and a shoulder $x$ in the block and tends to push the pin A forward. The pin A at one end is provided with the ring $a'$ or other means by which the cord D may be secured to it. The hook E is mounted on a shaft $b$, supported in the arms B', projecting from the block B. It is provided with the tail $e$ at one end, while the other end has in it the opening $e'$ to receive the end of the pin A. The spring F is so arranged as to bear against the tail $e$, a convenient arrangement being that shown in the drawings, where the spring is wound around the shaft $b$ and has its ends $f$ attached to the block B, while its yoke $f'$ presses against the tail $e$. The hook G is placed on the back of the block B and serves as an attachment for the trace H or back-strap I, according to the position it occupies.

In attaching the device to harness the detaching device is put at the front end of each trace, the trace being attached to the hook G. The hook E of each detaching device engages with the hame-hook J or corresponding device of each side. One of the detaching devices is also inserted in the course of the back-strap I, as shown in Fig. 1. This back-strap I supports the side backing strap or straps W. The trace-detaching cords D are conveniently led from each side to the horse's back and then joined with the detaching-cord D from the top detaching device, whence they are continued by a single cord to the vehicle. Instead of this arrangement each cord D may be separately led to the vehicle; or the cords D, for detaching the traces, may be united behind the horse and continued by a single cord to the vehicle.

When it becomes necessary to detach the horse from the vehicle, the cords D are drawn taut, thus withdrawing the pins A into the blocks B and permitting the springs F to throw the hooks E into the position shown in dotted lines in Fig. 3. The hook E in this position escapes from its attachment, thus detaching the horse from the vehicle.

To prevent an accident to the vehicle by the shafts dropping when the horse escapes, I provide the cord K, which extends from the vehicle to each shaft at Y and which serves to hold up the shafts after the horse has left them.

The point of attachment of cord K to the shaft may be varied as desired, a very convenient point of attachment being shown at Z, the eye attached to the shaft and the cord K being shown in dotted lines.

The cords D and K may be made continuous, as shown, and arranged to pass over a pulley L at the bottom of the vehicle, where (as is preferably the case in teams) the backing-straps W are omitted. The detaching device located on the back of the horse and in the vicinity of the harness-saddle may also be omitted.

What I claim as new, and desire to secure by Letters Patent, is—

1. The combination of block B, detaching-pin A, tension-spring C, surrounding pin A, hook E, pivoted in block B and provided with arm $e$, spring F, bearing against arm $e$, and trace-hook G, substantially as and for the purposes specified.

2. The combination of block B, detaching-pin A, tension-spring C, surrounding pin A, hook E, pivoted in block B and provided with arm $e$, spring F, bearing against arm $e$, trace-hook G, cord D, pulley L, and cords K, attached to the shafts and continuous with cord D, substantially as and for the purposes specified.

GEO. AMOS.

Attest:
WM. E. JONES,
G. A. W. PAVER.